(12) United States Patent
Jagger et al.

(10) Patent No.: US 7,647,376 B1
(45) Date of Patent: Jan. 12, 2010

(54) SPAM REPORT GENERATION SYSTEM AND METHOD

(75) Inventors: Luke D. Jagger, Aylesbury (GB);
William R. Dennis, Aylesbury (GB);
Anton C. Rothwell, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 1536 days.

(21) Appl. No.: 10/072,708

(22) Filed: Feb. 5, 2002

Related U.S. Application Data

(63) Continuation-in-part of application No. 09/916,599, filed on Jul. 26, 2001, now Pat. No. 7,016,939.

(51) Int. Cl.
*G06F 15/16* (2006.01)

(52) U.S. Cl. .................................. 709/206; 709/207

(58) Field of Classification Search ................. 709/206, 709/207
See application file for complete search history.

(56) References Cited

U.S. PATENT DOCUMENTS

| | | | | |
|---|---|---|---|---|
| 5,121,345 | A | 6/1992 | Lentz | 364/550 |
| 5,509,120 | A | 4/1996 | Merkin et al. | 395/186 |
| 5,619,648 | A | 4/1997 | Canale et al. | 395/200.01 |
| 5,623,600 | A | 4/1997 | Ji et al. | 395/187.01 |
| 5,765,028 | A | 6/1998 | Gladden | 707/10 |
| 5,832,208 | A | 11/1998 | Chen et al. | 395/187.01 |
| 5,870,549 | A | 2/1999 | Bobo, II | 395/200.36 |
| 5,999,932 | A | 12/1999 | Paul | 707/10 |
| 6,047,277 | A | 4/2000 | Parry et al. | 706/20 |
| 6,052,709 | A | 4/2000 | Paul | 709/202 |
| 6,092,101 | A | 7/2000 | Birrell et al. | 709/206 |
| 6,199,102 | B1 | 3/2001 | Cobb | 709/206 |
| 6,330,590 | B1 | 12/2001 | Cotten | 709/206 |
| 6,356,935 | B1 * | 3/2002 | Gibbs | 709/206 |
| 6,393,465 | B2 * | 5/2002 | Leeds | 709/207 |
| 6,421,709 | B1 | 7/2002 | McCormick et al. | 709/206 |
| 6,453,327 | B1 * | 9/2002 | Nielsen | 715/205 |
| 6,609,081 | B1 | 8/2003 | de Varennes et al. | 702/176 |
| 6,615,242 | B1 | 9/2003 | Riemers | 709/206 |
| 6,650,890 | B1 | 11/2003 | Irlam et al. | 455/412.1 |
| 6,654,787 | B1 * | 11/2003 | Aronson et al. | 709/206 |
| 6,675,162 | B1 | 1/2004 | Russell-Falla et al. | 707/5 |

(Continued)

FOREIGN PATENT DOCUMENTS

EP    0 813 162    12/1997

(Continued)

OTHER PUBLICATIONS

Application from U.S. Appl. No. 09/916,599, filed Jul. 26, 2001.

(Continued)

*Primary Examiner*—George C Neurauter, Jr.
*Assistant Examiner*—Asghar Bilgrami
(74) *Attorney, Agent, or Firm*—Zilka-Kotab, PC

(57) ABSTRACT

A method of the present invention generally comprises receiving an electronic mail message and determining whether the electronic message is an unsolicited message. If the message is an unsolicited message, it is examined to identify a network address relating to the message and an authority hosting the network address. A report is then generated containing the identified network address and the hosting authority.

31 Claims, 4 Drawing Sheets

U.S. PATENT DOCUMENTS

| | | | |
|---|---|---|---|
| 6,687,740 B1 * | 2/2004 | Gough et al. | 709/206 |
| 6,691,156 B1 * | 2/2004 | Drummond et al. | 709/206 |
| 6,718,367 B1 | 4/2004 | Ayyadurai | 709/206 |
| 6,732,157 B1 | 5/2004 | Gordon et al. | 709/206 |
| 6,748,422 B2 * | 6/2004 | Morin et al. | 709/206 |
| 6,769,016 B2 | 7/2004 | Rothwell et al. | 709/206 |
| 6,915,334 B1 * | 7/2005 | Hall | 709/207 |
| 7,209,954 B1 | 4/2007 | Rothwell et al. | 709/206 |
| 2002/0016824 A1 * | 2/2002 | Leeds | 709/207 |
| 2002/0116463 A1 * | 8/2002 | Hart | 709/206 |
| 2002/0120705 A1 * | 8/2002 | Schiavone et al. | 709/207 |
| 2003/0088627 A1 * | 5/2003 | Rothwell et al. | 709/206 |

FOREIGN PATENT DOCUMENTS

| | | |
|---|---|---|
| WO | 99/67731 | 12/1999 |

OTHER PUBLICATIONS

Office Action mailed Jul. 18, 2006 from U.S. Appl. No. 11/095,146.

Notice of Allowance from U.S. Appl. No. 11/095,146 mailed on Dec. 15, 2006.

Office Action Summary from U.S. Appl. No. 09/916,599 mailed on Oct. 7, 2004.

Office Action Summary from U.S. Appl. No. 09/916,599 mailed on Feb. 23, 2005.

Notice of Allowance from U.S. Appl. No. 09/916,599 mailed on Jun. 10, 2005.

Notice of Allowance from U.S. Appl. No. 09/916,599 mailed on Sep. 23, 2005.

* cited by examiner

SPAM REPORT GENERATION SYSTEM AND METHOD

This application is a continuation-in-part of an application filed Jul. 26, 2001 under application Ser. No. 09/916,599 U.S. Pat. No. 7,016,939.

BACKGROUND OF THE INVENTION

The present invention relates generally to electronic mail ('e-mail'), and more specifically, to a method and system for identifying and reporting SPAM e-mail messages.

Unsolicited bulk e-mail, commonly referred to as "SPAM", is increasingly becoming a nuisance to computer users. SPAM itself is not illegal, however, the content of some messages may violate laws or the SPAM initiator's contract with his Internet Service Provider (ISP). SPAM e-mail is generally defined as an unsolicited mailing, usually to a large number of people. SPAM can be very annoying to the recipient because it interrupts other activities, consumes system resources, and requires active efforts by recipients who want to dispose of these unwanted messages.

SPAM is also an increasing problem for Internet service providers and entities with easily identifiable e-mail addresses such as large corporations. ISPs object to junk mail because it reduces their users' satisfaction of the services. Corporations want to eliminate junk mail because it reduces worker productivity. SPAM impacts organizations by occupying employees' time and increasing security risks. Time is spent by employees to open each message, classify it as legitimate or junk e-mail, and delete the message. Time may also be spent by employees following up on advertising content while on the job. Employees may also be deceived into acting improperly, such as to release confidential information, due to a forged message. There is also a loss of the network administrator's time in dealing with SPAM and forged messages, as well as the use of network bandwidth, disk space, and system memory required to store the messages. Also, in the process of deleting junk mail, users may inadvertently discard or overlook other important messages. Another objection to SPAM is that it is frequently used to advertise objectionable, fraudulent, or dangerous content, such as pornography or to propagate financial scams such as illegal pyramid schemes.

The person or organization that generates the junk mail (referred to as a 'spammer') often gets around filtering methods by using a different e-mail address for each mailing or forwarding his e-mail by way of an intermediary to conceal the actual origin. Instead of mailing directly from an easily traced account at a major Internet service provider, spammers may, for instance, send their e-mail from a SPAM-friendly network, using forged headers, and relay the message through intermediate hosts. However, the e-mail message often contains an actual web site that relates to the message so that the recipient can find additional information on the advertised product or service. No action can be taken against the person or organization that generates the junk mail unless that person or organization is identified and someone reports the problem to the relevant authority.

There is, therefore, a need for a system and method for identifying and reporting SPAM to the appropriate authority so that the authority can take action to prevent the spammer from distributing further unsolicited e-mail.

SUMMARY OF THE INVENTION

A method and system for generating a report on an unsolicited electronic message and sending the report to the relevant authority are disclosed.

A method of the present invention generally comprises receiving an electronic mail message and determining whether the electronic message is an unsolicited message. If the message is an unsolicited message, it is examined to identify a network address relating to the message and an authority hosting the network address. A report is then generated containing the identified network address and the hosting authority.

The generated report is sent to the hosting authority or to a central managed service provider that collects reports and transmits them to the appropriate authority. The reports may also be held and collected over a period of time before they are sent out.

A system of the present invention generally comprises a detector operable to detect a network address within an electronic message identified as an unsolicited message and a host identifier operable to identify an authority hosting the network. The system further includes a report generator operable to generate a report containing the identified network address and hosting authority and a storage medium configured to at least temporarily store the identified network address and hosting authority.

In one embodiment, the system includes a database that contains common words and phrases that can be used in searching for a URL within the message. The host identifier may then use an Internet tool to identify the organization hosting the web site of the URL.

In another aspect of the present invention, a computer product generally comprises code that receives an electronic mail message and determines whether the electronic message is an unsolicited message. The product further includes code that examines the message to identify a network address relating to the message if the message is an unsolicited message and code that identifies an authority hosting the network address and generates a report containing the identified network address. A computer readable medium is provided to store the computer codes.

The above is a brief description of some deficiencies in the prior art and advantages of the present invention. Other features, advantages, and embodiments of the invention will be apparent to those skilled in the art from the following description, drawings, and claims.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention provides a method and system for generating a report upon detection of unsolicited or SPAM electronic mail ('e-mail') messages. The report is preferably automatically generated upon detection of an unsolicited e-mail. In one embodiment, the system sends the report to the relevant authority (e.g., Internet Service Provider (ISP) or backbone provider hosting the spammer). The report may be used by the authority to take action if necessary in shutting down a spammer's web site and mail access.

Figure 1:
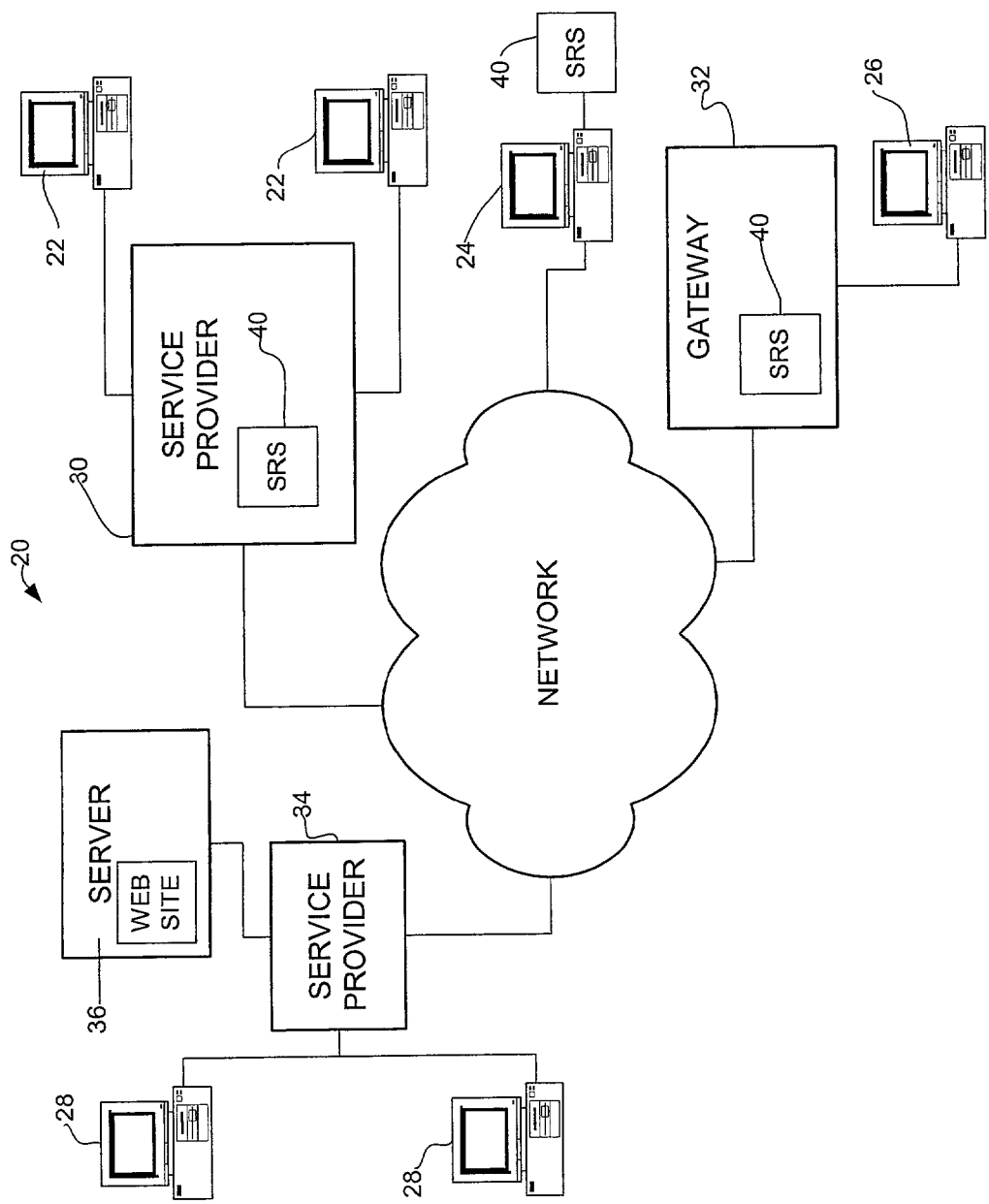
FIG. 1 is a diagram illustrating a network utilizing a system and method of the present invention.

Referring now to the drawings, and first to FIG. 1, a system that may utilize the present invention is shown and generally indicated at 20. The system 20 includes user computers 22, 24, 26, 28 (described further below) in communication with one another through a network. User computers 22, 24, 26 may receive, for example, unsolicited e-mail from user computers 28 which are operated by spammers. User computers 22 receive e-mail through service provider 30 and user computer 26 receives e-mail through gateway 32. Computer 24 receives e-mail directly from the network. SPAM reporting systems (SRS) 40 are installed within the network and configured to detect SPAM, identify a source host, and generate a report transmitting information about the SPAM to the source host. Spam reporting system 40 is preferably installed at an Internet service provider or gateway, but may also be installed at a user computer.

In the network shown in FIG. 1, service provider 30, gateway 32, and computer 24 each include SPAM reporting system 40. In the present example, user computers 28 are coupled to a service provider 34 along with server 36 which includes a web site set up by the spammers of user computers 28. It is to be understood that the SPAM may be sent from a different service provider than the one which hosts the spammer's web site. Upon receiving SPAM at computers 22, 24, or 26 from computers 28, a network address of the web site located at server 36 is identified, the service provider 34 supporting the web site is identified, and a report is generated by the SPAM reporting system 40, as described in detail below. The report contains details on the SPAM generated by service provider's customer and is transmitted to the service provider 34 for investigation by the appropriate authorities.

The network may include any number of servers 36 for hosting network sites (web sites). The servers are typically connected to the network at points of presence (POPs), established by network service providers at a variety of geographic locations. A given geographic location, such as a metropolitan area, will typically contain multiple POPs established by different network service providers. Each POP may supply Internet connections to one or more users and servers. The connection between POPs, users, and servers may include any suitable transmission media, including, but not limited to, public telephone lines, T1 lines, T3 lines, dial-up, DSL (Digital Subscriber Line), cable, Ethernet or wireless connections. The computers may be connected over a network such as the Internet, an intranet, a wide area network (WAN), local area network (LAN), or any other type of network. The computers may also be directly connected to one another or any number of other user computers. The computer may be a client computer coupled to an Internet service provider over a SLIP (Serial Line Interface Protocol) or PPP (Point to Point Protocol) connection. The Internet service provider is, in turn, coupled to the Internet, the client computer thereby having the ability to send and receive information to other nodes on the Internet using a TCP/IP protocol (Transmission Control Protocol/Internet Protocol).

It is to be understood that the network configuration and interconnections shown in FIG. 1 and described herein, are provided for purposes of illustration only. One of ordinary skill in the art will readily appreciate that the present invention may be practiced on networks more or less complex than that shown, in accordance with the teachings contained herein.

Figure 2:
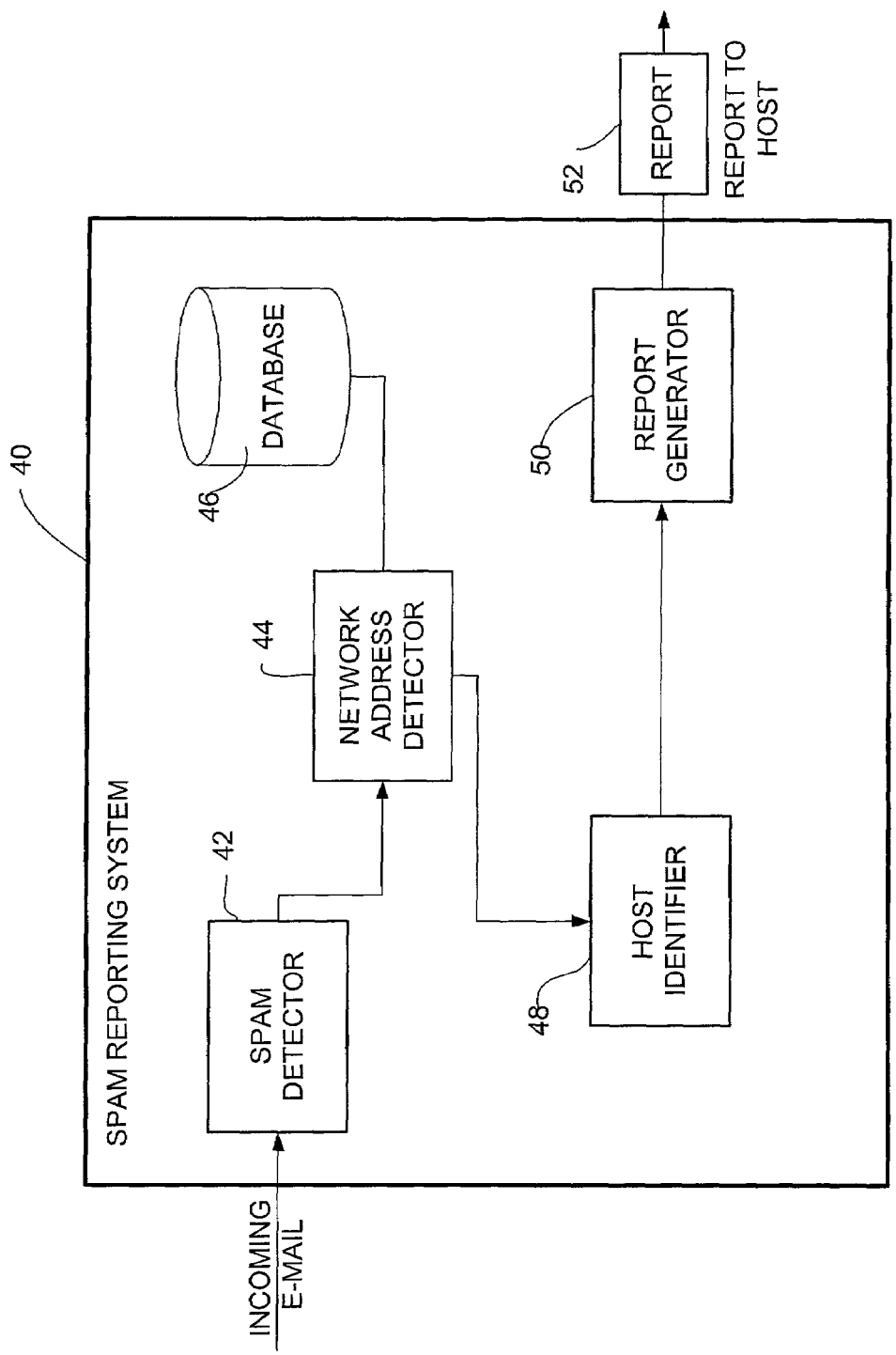
FIG. 2 is a block diagram illustrating a SPAM reporting system of the present invention.

FIG. 2 illustrates additional detail of the SPAM reporting system 40. The system includes a SPAM detector 42, network address detector 44, SPAM database 46, host identifier 48, and report generator 50. The SPAM detector 42 may be any device configured for distinguishing SPAM e-mail from legitimate e-mail. In one embodiment, the detector is an intelligent SPAM detection system using statistical analysis or an updateable neural analysis engine, as disclosed in U.S. patent application Ser. Nos. 09/916,599 and 09/916,930, both filed Jul. 26, 2001, which are incorporated herein by reference in their entirety. These devices use a statistical analyzer to gather statistics associated with text in the e-mail message and a neural network engine coupled to the statistical analyzer which is taught to recognize unwanted messages based on statistical indicators. The statistical indicators are analyzed utilizing the neural network engine for determining whether the electronic mail message is an unwanted message. It is to be understood that other types of SPAM detectors may be used without departing from the scope of the invention.

E-mail messages that are identified as SPAM by SPAM detector 42 are sent to network address detector 44, which is used to identify the URL (Uniform Resource Locator), or other applicable network address, of a web site pertaining to the message. As previously discussed, much of the information that is included in the SPAM e-mail message is typically spoofed, and therefore cannot be used to identify the true source of the mail. However, it is common for SPAM e-mails to contain URL's of web sites relating to the e-mail message. These are typically valid web sites since they must allow the recipient of the e-mail to follow up on the spammer's offer. The web site may contain, for example, information on how to obtain products or sign up for services advertised in the spammer's original message. The URL may then be used to track the origin of the spammer's e-mail or a web site they are using to sell their product or service.

In addition to locating the URLs within the e-mail, the network address detector 44 is configured to examine the text surrounding the URL to determine the likelihood that the URL is an address of the spammer's web site. For example, text within a SPAM e-mail may include:

"Visit our web site at http:// . . . "; or

"Come and see Sexy Suzy at http:// . . . ".

The network address detector 44 is coupled to SPAM database 46 which contains common words or phrases associated with an advertised web site. The database 46 preferably uses wildcards in validating the surroundings of a URL as the spammer's web site.

The SPAM database 46 also includes a list of known valid (or trusted) senders of e-mails to rule out network addresses that may be present in the legitimate e-mail messages. For example, in the case where a SPAM e-mail was forwarded through an innocent party. The database may be pre-populated, but is preferably updateable by a system administrator to ensure that the SPAM reporting system 40 does not become a nuisance to innocent third parties.

Once a network address is identified, host identifier 48 is used to locate the web server hosting the spammer's web pages. Many Internet service providers require their subscribers to sign contracts that forbid SPAM. It is therefore appropriate to report the SPAM to any service provider whose users originate SPAM. WHOIS, NSlookup, Finger, Telnet, Ping, Traceroute, or any other address tracing tool may be used to identify the ISP and report the problem. NSlookup allows for recovery of the IP address from a domain name. Traceroute demonstrates the route that a packet takes from an arbitrary Internet site to another arbitrary site.

If the URL contains a raw IP address, a reverse DNS (Domain Name Server) lookup may be used to identify the domain name of the web site. Once the domain name is found, a WHOIS lookup may be used to identify the individuals who are involved in maintaining the spammer's Internet domain. The WHOIS report contains various administrative contacts for the owner of the domain, such as shown below:

WHOIS Information for someorg.com
    Registrar: NETWORK SOLUTIONS, INC.
    Organization: Some Organization, Inc.
    Address: 123 Some Lane, Somewhere
    Admin contact: Hostmaster
    E-mail: j.spammer@lotsaSpamISP.com
    Phone: 123-4567
    Fax: 876-5432
    Tech contact: Hostmaster
    E-mail: j.spammer@lotsaSpamISP.com
    Phone: 123-4567
    Fax: 876-5432
    Nameservers: dns1.someorg.com
      dns2.someorg.com It also specifies the organization that the domain is registered with, and where this individual or organization's mail is hosted. This information is used by the report generator 50 to generate an e-mail message to the responsible organization incorporating details of the suspected SPAM, as further described below.

The WHOIS report may also contain additional contact information for parent organizations. For example, if a small ISP is hosted by a larger backbone provider this information may be included in the report. The system administrator may have the option of notifying the organization only, or also notifying the parent organization. As used herein, the term 'hosting authority' refers to any organization responsible, either directly or indirectly, for hosting the spammer's web site, domain, or e-mail account.

The report generator 50 uses the hostmaster or postmaster e-mail address provided by the host identifier 48 to generate a report 52 which is sent by e-mail to the hosting authority. The report 52 may include, for example, content of the suspected SPAM e-mail, date and time the e-mail arrived on recipient's server, IP address and name reported during the SMTP connection, and the full WHOIS report used to track down the responsible authority. The IP address and name reported during SMTP connection may be spoofed, but this may be useful in tracking down an open SPAM relay that the spammer is using. The report 52 may also include disclaimer information and user definable text. The e-mail message used to transmit the report 52 to the relevant authority may also be signed to verify the source. It is to be understood that the report may contain less information than noted above or additional information without departing from the scope of the invention.

In order to prevent the SPAM reporting system 40 from becoming a nuisance to the authorities, the system 40 may include a device which restricts the frequency and number of reports sent to any given authority. For example, the information on spammers may be collected and reported only once a month.

The system 40 may also be configured to include one or more central Managed Service Providers (MSPs) which are responsible for collecting information from a number of organizations. Each MSP is responsible for reporting spammers to authorities once enough evidence has been collected from one or more organizations for a particular SPAM threat. The device reduces the chance of multiple organizations sending individual reports, and thus further reduces the possibility of the SPAM reporting system 40 becoming a nuisance itself.

Figure 3:
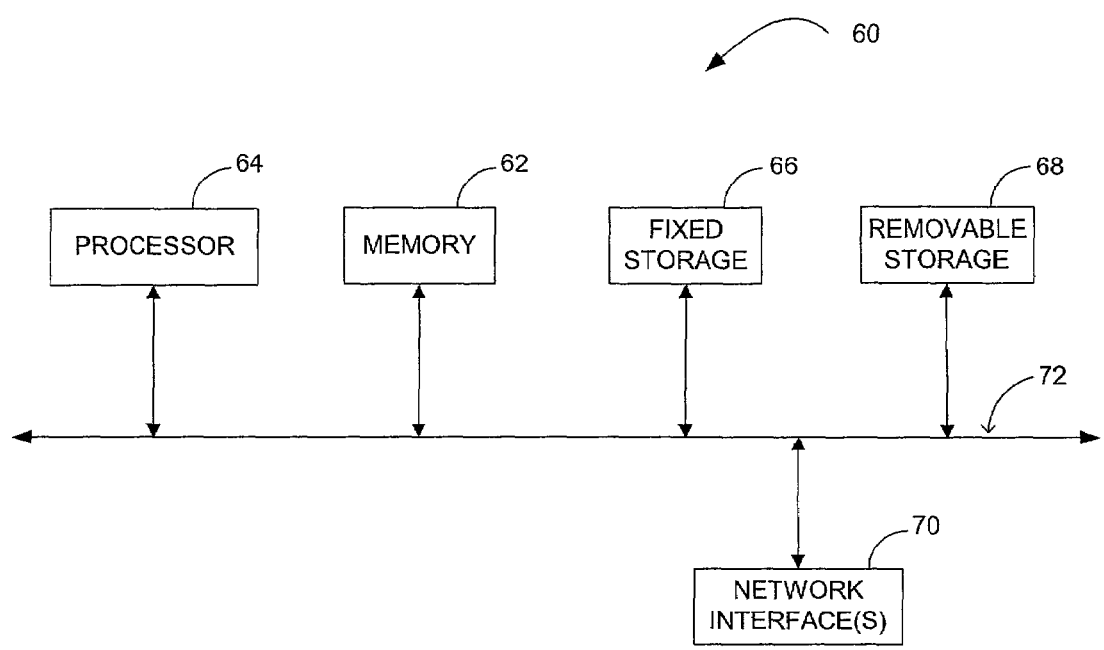
FIG. 3 is a block diagram of a computer system that can be utilized to execute software of an embodiment of the invention.

The computer on which the SPAM reporting system is installed may be a stand-alone desktop computer, laptop computer, server, mainframe, or a mobile or handheld computing device (e.g., personal digital assistant (PDA) or mobile phone), for example. FIG. 3 shows a system block diagram of computer system 60 that may be used as the user computer, server, or other computer system to execute software of an embodiment of the invention. As shown in FIG. 3, the computer system 60 includes memory 62 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 60 further includes subsystems such as a central processor 64, fixed storage 66 (e.g., hard drive), removable storage 68 (e.g., CD-ROM drive), and one or more network interfaces 70. Other computer systems suitable for use with the invention may include additional or fewer subsystems. For example, computer system 60 may include more than one processor 64 (i.e., a multi-processor system) or a cache memory. The computer system 60 may also include a display, keyboard, and mouse (not shown) for use as a desktop or laptop computer.

The system bus architecture of computer system 60 is represented by arrows 72 in FIG. 3. However, these arrows are only illustrative of one possible interconnection scheme serving to link the subsystems. For example, a local bus may be utilized to connect the central processor 64 to the system memory 62. Computer system 60 shown in FIG. 3 is only one example of a computer system suitable for use with the invention. Other computer architectures having different configurations of subsystems may also be utilized. Communication between computers within the network is made possible with the use of communication protocols, which govern how computers exchange information over a network, as is well known by those skilled in the art.

Figure 4:
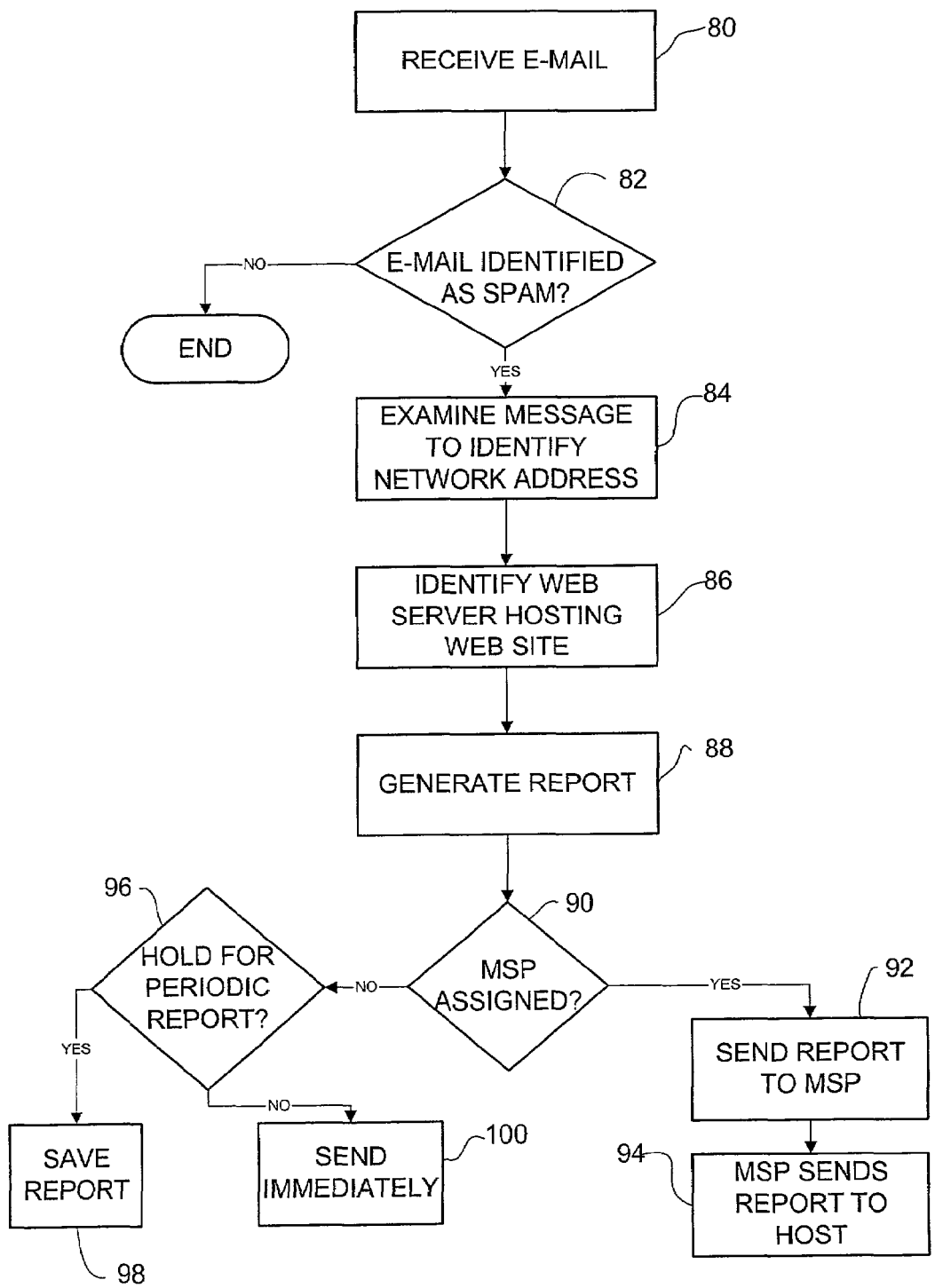
FIG. 4 is a flowchart illustrating a process of the present invention for generating a SPAM report

FIG. 4 is a flowchart illustrating a process of the present invention for identifying the source of a SPAM e-mail message and generating a report to notify the relevant authority. At step 80 an e-mail is received. The SPAM detector 42 determines whether the e-mail is legitimate or unsolicited (step 82). If the e-mail is found to be unsolicited the message is examined to find the network address of the web site relating to the message (step 84). Once the network address is identified, the host identifier 48 is used to locate the web server hosting the web site (step 86). Report 52 is then generated containing the information found by the host identifier 48 and additional information such as content of message, IP address, and information used to trace the message to the host (step 88). If an MSP is assigned to collect and send generated reports, the report is sent to the MSP, which in turn forwards the report to the appropriate authority (steps 90, 92, and 94). If an MSP is not assigned, but the system is configured to hold the reports for a period of time (e.g., collect all reports until the end of the month), the report is temporarily saved (steps 96 and 98). If the system is not configured to collect and hold reports, the report is sent immediately to the relevant authority (step 100).

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for generating a report on an unsolicited electronic message, comprising: receiving an electronic mail message; determining whether the electronic message is an unsolicited message; if the message is an unsolicited message, examining the message to identify a network address relating to the message, identifying an authority hosting the network address, generating a report containing the identified network address and hosting authority, and transmitting the report to a central managed service provider, where the central managed service provider collects threat information from one or more organizations and reports to the hosting authority once a predetermined amount of threat information has been collected; wherein identifying the hosting authority comprises identifying an owner of a network domain; wherein reporting to the hosting authority includes the central managed service provider transmitting a hosting authority message including the collected threat information to the hosting authority; wherein the hosting authority message that the central managed service provider transmits to the hosting authority includes a hosting authority report that includes a content of the message, a date and time the message arrived on a recipient's server, an IP address and name reported during an SMTP connection associated with the message, and a full WHOIS report used to track down the hosting authority.

2. The method of claim 1 further comprising transmitting the generated report to the identified hosting authority.

3. The method of claim 1 wherein examining the message to identify a network address comprises identifying a URL.

4. The method of claim 3 wherein identifying a URL comprises comparing text within the electronic message to a database of words to identify the URL.

5. The method of claim 3 further comprising comparing the identified URL to a database of legitimate URLs.

6. The method of claim 5 further comprising updating the database based on electronic messages received.

7. The method of claim 3 wherein identifying the hosting authority comprises utilizing an Internet tool to locate a web server hosting the URL.

8. The method of claim 7 wherein utilizing an Internet tool comprises utilizing WHOIS.

9. The method of claim 1 wherein identifying the hosting authority comprises identifying an Internet service provider.

10. The method of claim 1 wherein the central managed service provider is configured to forward the report to the identified hosting authority.

11. The method of claim 1 further comprising at least temporarily saving the report and transmitting the report to the identified hosting authority at the end of a specified period.

12. A system, the system comprising: a detector that detects a network address within an electronic message identified as an unsolicited message; a host identifier that identifies an authority hosting the network address; a report generator that generates a report containing the identified network address and hosting authority; and a tangible computer readable storage medium that at least temporarily stores the identified network address and hosting authority; wherein identifying the hosting authority comprises identifying an owner of a network domain; wherein the system is operable such that the report is transmitted to a central managed service provider, where the central managed service provider collects threat information from one or more organizations and reports to the hosting authority once a predetermined amount of threat information has been collected; wherein reporting to the hosting authority includes the central managed service provider transmitting a hosting authority message including the collected threat information to the hosting authority; wherein the system is operable such that the hosting authority message that the central managed service provider transmits to the hosting authority includes a hosting authority report that includes a content of the message, a date and time the message arrived on a recipient's server, an IP address and name reported during an SMTP connection associated with the message, and a full WHOIS report used to track down the hosting authority.

13. The system of claim 12 further comprising a detector operable to detect unsolicited messages.

14. The system of claim 12 wherein the network address is a URL.

15. The system of claim 12 wherein the hosting authority is an Internet service provider.

16. The system of claim 12 further comprising a processor operable to transmit the generated report.

17. The system of claim 16 wherein the processor is configured to transmit the report to the identified hosting authority.

18. The system of claim 16 wherein the processor is configured to transmit the report to the central managed service provider.

19. The system of claim 12 further comprising a database containing search terms used to identify the network address within text of the electronic message.

20. The system of claim 12 further comprising a database containing a list of trusted network addresses.

21. A computer product embodied on a tangible computer readable storage medium, comprising: code that receives an electronic mail message; code that determines whether the electronic message is an unsolicited message; code that examines the message to identify a network address relating to the message if the message is an unsolicited message; code that identifies an authority hosting the network address; code that generates a report containing the identified network address; and a computer readable medium that stores said computer codes; wherein identifying the hosting authority comprises identifying an owner of a network domain; wherein the computer product is operable such that the report is transmitted to a central managed service provider, where the central managed service provider collects threat information from one or more organizations and reports to the hosting authority once a predetermined amount of threat information has been collected; wherein reporting to the hosting authority includes the central managed service provider transmitting a hosting authority message including the collected threat information to the hosting authority; wherein the computer program product is operable such that the hosting authority message that the central managed service provider transmits to the hosting authority includes a hosting authority report that includes a content of the message, a date and time the message arrived on a recipient's server, an IP address and name reported during an SMTP connection associated with the message, and a full WHOIS report used to track down the hosting authority.

22. The computer product of claim 21 wherein the computer readable medium includes at least one of CD-ROM, floppy disk, tape, flash memory, system memory, and hard drive.

23. The computer product of claim 21 further comprising code that transmits the generated report to the identified hosting authority.

24. The computer product of claim 21 further comprising code that compares text within the electronic message to a database of words to locate the network address within the text.

25. The computer product of claim 21 further comprising code that compares the identified network address with trusted network addresses.

26. The method of claim 1 wherein identifying the hosting authority further comprises identifying an address, an administrative contact name, an administrative contact telephone number, and a name of at least one server associated with the hosting authority.

27. The method of claim 1 wherein identifying the hosting authority further comprises identifying an organization to which the network domain is registered.

28. The method of claim 27 wherein the report is utilized to generate an electronic mail message to be sent to the identified organization.

29. The method of claim 4, wherein identifying the URL further comprises examining text surrounding the URL to determine a likelihood that the URL is an address of a web site associated with unsolicited messages.

30. The method of claim 1 wherein the report includes disclaimer information and user definable text.

31. The method of claim 1, wherein the hosting authority message that the central managed service provider transmits to the hosting authority is signed to verify the central managed service provider as a source of the hosting authority message.

* * * * *

UNITED STATES PATENT AND TRADEMARK OFFICE
CERTIFICATE OF CORRECTION

PATENT NO. : 7,647,376 B1  
APPLICATION NO. : 10/072708  
DATED : January 12, 2010  
INVENTOR(S) : Jagger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this

Twenty-eighth Day of December, 2010

David J. Kappos  
*Director of the United States Patent and Trademark Office*